(12) United States Patent
Thoon et al.

(10) Patent No.: US 8,788,637 B2
(45) Date of Patent: Jul. 22, 2014

(54) SYSTEMS AND METHODS FOR DOWNLOADING BOOT CODE ASSOCIATED WITH BASE STATIONS

(75) Inventors: Koh Yew Thoon, Singapore (SG); Mun Tuck Wong, Singapore (SG)

(73) Assignee: Hewlett-Packard Development Company, L.P., Houston, TX (US)

(*) Notice: Subject to any disclaimer, the term of this patent is extended or adjusted under 35 U.S.C. 154(b) by 1414 days.

(21) Appl. No.: 12/202,350

(22) Filed: Sep. 1, 2008

(65) Prior Publication Data

US 2009/0119658 A1    May 7, 2009

Related U.S. Application Data

(60) Provisional application No. 60/985,309, filed on Nov. 5, 2007.

(51) Int. Cl.
- G06F 15/177 (2006.01)
- G06F 9/44 (2006.01)
- H04L 12/24 (2006.01)
- H04L 7/00 (2006.01)

(52) U.S. Cl.
CPC .......... G06F 9/4416 (2013.01); H04L 12/2424 (2013.01); H04L 7/0004 (2013.01)
USPC ............................ 709/222; 709/220; 717/171

(58) Field of Classification Search
CPC .. G06F 9/4416; H04L 7/0004; H04L 12/2424
USPC ........... 709/219, 220, 221, 222; 717/171, 176
See application file for complete search history.

(56) References Cited

U.S. PATENT DOCUMENTS

| | | | |
|---|---|---|---|
| 6,993,650 B2 | 1/2006 | Landers, Jr. et al. | |
| 7,103,641 B2* | 9/2006 | Brannock | 709/217 |
| 2004/0093597 A1* | 5/2004 | Rao et al. | 717/171 |
| 2004/0230968 A1* | 11/2004 | Masunaga et al. | 717/171 |
| 2005/0021933 A1* | 1/2005 | Wang et al. | 713/1 |
| 2006/0133332 A1* | 6/2006 | Achanta | 370/338 |
| 2006/0143475 A1* | 6/2006 | Herbert et al. | 713/191 |
| 2007/0025306 A1 | 2/2007 | Cox et al. | |
| 2009/0077634 A1* | 3/2009 | Hung | 726/4 |

* cited by examiner

Primary Examiner — Brian J Gillis

(57) ABSTRACT

Systems and methods for maintaining base stations are provided. In this regard, a representative system, among others, includes at least one base station that is electrically coupled to a server. The base station includes memory and a first boot code that is stored in the memory. The first boot code has a first set of instructions, which is configured to initialize a control module and a network device. The first set of instructions is further configured to instruct the initialized control module and network device to establish a connection between the server and the base station and download a second boot code from the server into the memory of the base station. The second boot code has a second set of instructions, which is different than the first set of instructions.

18 Claims, 3 Drawing Sheets

US 8,788,637 B2

SYSTEMS AND METHODS FOR DOWNLOADING BOOT CODE ASSOCIATED WITH BASE STATIONS

CROSS-REFERENCE TO RELATED APPLICATIONS

This Utility Patent Application is based on and claims the benefit of U.S. Provisional Application No. 60/985,309, filed on Nov. 5, 2007, the contents of which are hereby incorporated by reference in their entirety.

TECHNICAL FIELD

The present disclosure generally relates to network infrastructures, and more particularly, the disclosure relates to systems and methods for downloading boot code associated with base stations over a network.

BACKGROUND

Wireless local area networks (WLANs) have become increasingly popular in various scenarios, such as, in homes, offices, and public places. Generally, WLAN includes wireless access points (APs) and/or radio ports (RPs) that use boot code in flash memory to start the APs and RPs. During the startup or rebooting of the APs and RPs, the boot code typically provides instructions that initialize hardware components of the APs and RPs and determine whether the hardware components are working properly. As more features are added to the APs and RPs, the boot code becomes larger, resulting in larger flash memory and higher cost of producing the APs and RPs.

SUMMARY

Systems and methods for downloading boot code over a network are provided. In this regard, a representative system, among others, includes at least one base station that is electrically coupled to a server. The base station includes memory and a first boot code that is stored in the memory. The first boot code has a first set of instructions, which is configured to initialize a control module and a network device. The first set of instructions is further configured to instruct the initialized control module and network device to establish a connection between the server and the base station and download a second boot code from the server into the memory of the base station. The second boot code has a second set of instructions, which is different than the first set of instructions.

A representative method, among others, for downloading boot code over a network comprises the following steps: storing a first boot code in memory of a base station, the first boot code having a first set of instructions; initializing a control module and a network device based on the first set of instructions; establishing a connection between the server and the base station using the initialized control module and network device based on the first set of instructions; and downloading a second boot code from the server into the memory of the base station using the initialized control module and network device based on the first set of instructions, the second boot code having a second set of instructions, the second set of instructions being different than the first set of instructions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which boot code from a server can be downloaded to base stations.

Figure 1:
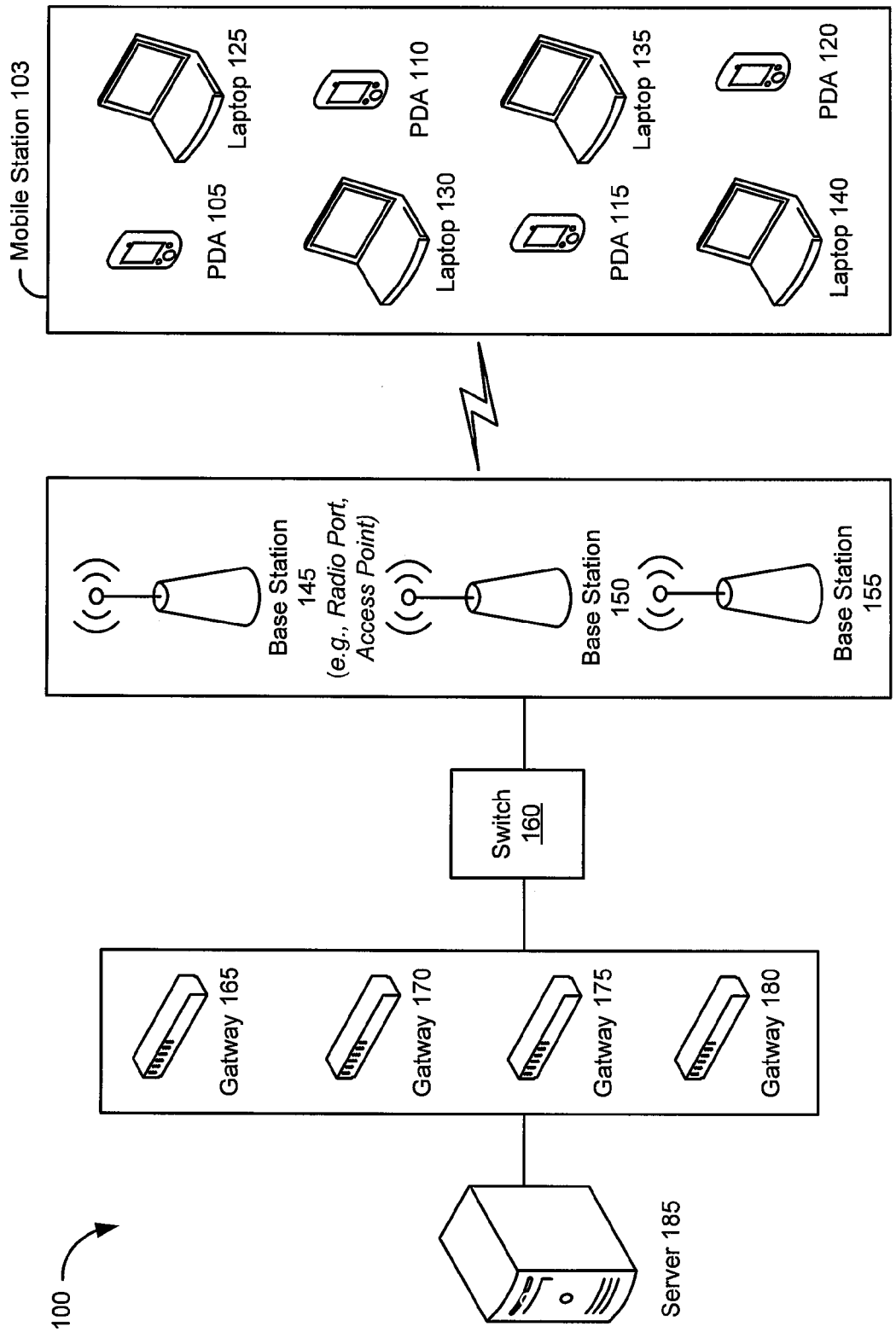
FIG. 1 is a block diagram that illustrates an embodiment of a network infrastructure that includes base stations configured to download boot code over a network.

FIG. 1 is a block diagram that illustrates an embodiment of a network infrastructure 100 that includes one or more base stations configured to download boot code over a network. The network infrastructure 100 includes one or more mobile stations 103, for example but not limited to, personal digital assistants (PDAs) 105, 110, 115, 120 and laptops 125, 130, 135, 140, among others. The mobile station 103 can communicate wirelessly with base stations 145, 150, 155, which include, for example, radio ports and access points, among others. The base stations 145, 150, 155 are electrically coupled to a switch 160, which in turn is electrically coupled to one or more gateways 165, 170, 175, 180. A server 185 is electrically coupled to the gateways 165, 170, 175, 180.

The base station 145, 150, 155 is configured to download the boot code from the server 185 via the switch 160 and gateway 165, 170, 175, 180. The base station 145, 150, 155 and the server 185 are described further in relation to FIG. 2. Operations of the base station 145, 150, 155 and the server 185 for downloading the boot code are described in relation to FIG. 3. Although only one server 185 and one switch 160 are shown in system 100, the system 100 can include multiple servers and/or multiple switches.

Figure 2:
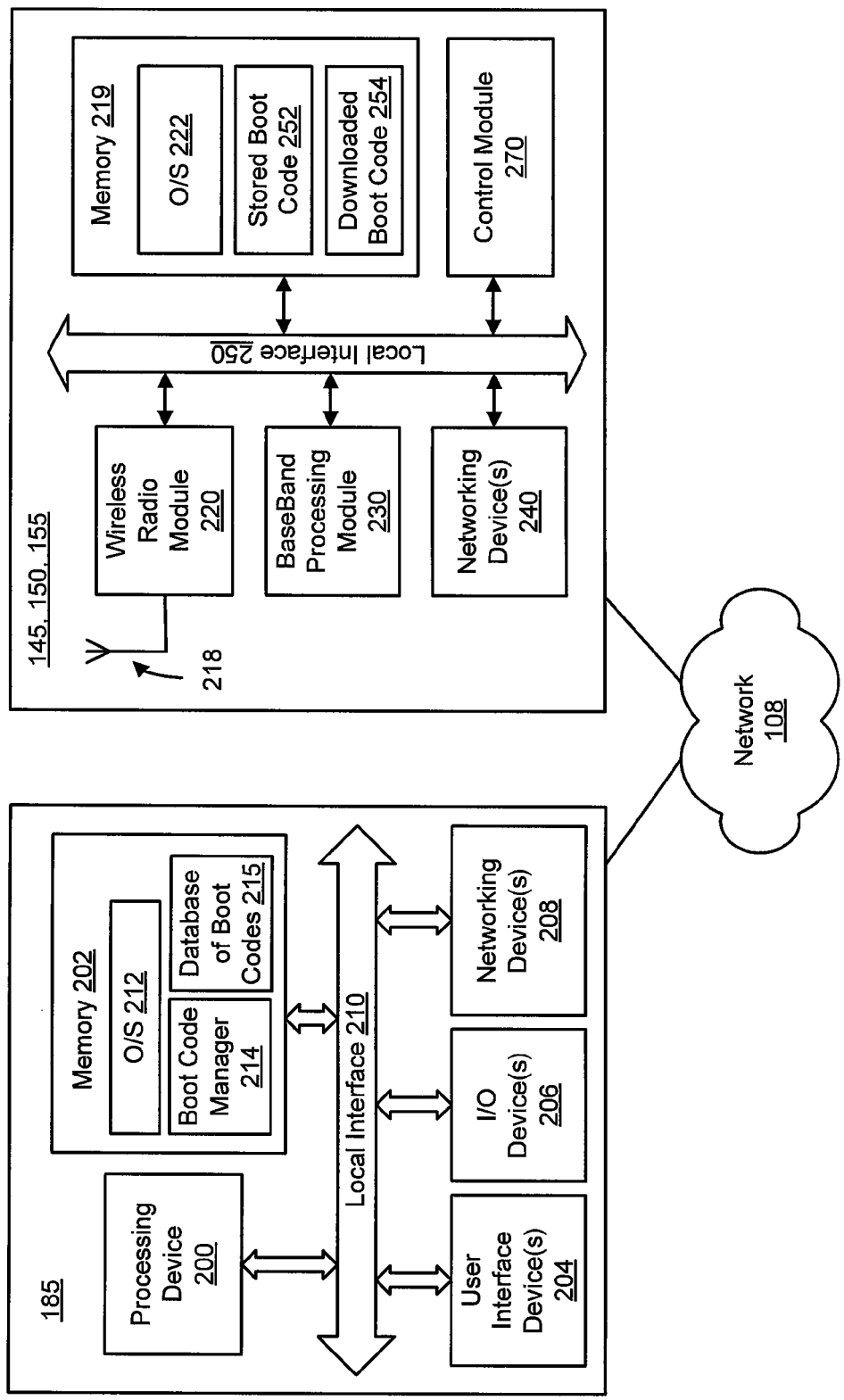
FIG. 2 is a block diagram that illustrates exemplary architectures for the base stations and a server, such as that shown in FIG. 1.

FIG. 2 is a block diagram that illustrates exemplary architectures for the base stations 145, 150, 155 and the server 185, such as that shown in FIG. 1. As indicated in FIG. 2, the server 185 comprises a processing device 200, memory 202, one or more user interface devices 204, one or more I/O devices 206, and one or more networking devices 208, each of which is connected to a local interface 210. The local interface 210 can be, for example, but not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface 210 may include address, control, and/or data connections to enable appropriate communications among the aforementioned components.

The processing device 200 can include any custom made or commercially available processor, a central processing unit (CPU) or an auxiliary processor among several processors associated with the server 185, a semiconductor based microprocessor (in the form of a microchip), or a macroprocessor. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The one or more I/O devices 206 comprise components used to facilitate connection of the server 185 to other devices and therefore, for instance, comprise one or more serial, parallel, small system interface (SCSI), universal serial bus (USB), or IEEE 1394 (e.g., Firewire™) connection elements. The networking devices 208 comprise the various components used to transmit and/or receive data over the network 108, where provided. By way of example, the networking devices 208 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 202 can include any one or a combination of volatile memory elements (e.g., random access memory (RAM, such as DRAM, SRAM, etc.)) and nonvolatile memory elements (e.g., ROM, hard drive, tape, CDROM, etc.). The one or more user interface devices 204 comprise those components with which the user (e.g., administrator) can interact with the server 185. Where the server 185 comprises a desktop computer or similar device, these components can comprise those typically used in conjunction with a PC such as a keyboard and mouse.

The memory 202 normally comprises various programs (in software and/or firmware) including at least an operating system (O/S) 212, a boot code manager 214, and a database 215 of boot codes. The O/S 212 controls the execution of programs, including the boot code manager 214, and provides scheduling, input-output control, file and data management, memory management, and communication control and related services. The boot code manager 214 facilitates the process for downloading boot code to a base station 145, 150, 155 over a network 108. The database 215 of boot codes contains at least one boot code that can be downloaded by the base station 145, 150, 155. The network 108 can include, but is not limited to, a switch 160 (FIG. 1) and gateway 165, 170, 175, 180 (FIG. 1). Operations of the boot code manager 214 are described in relation to FIG. 3.

The base station 145, 150, 155 includes a wireless radio module 220 that is electrically coupled to an antenna 218, a baseband processing module 230, a network device 240, memory 219, and a control module 270, all of which are electrically coupled to a local interface 250 that facilitates communication among the respective devices. The local interface 250 of the base station 145, 150, 155 can be similar to the local interface 210 of the server 185, and therefore, the local interface 250 can be, for example, but not limited to, one or more buses or other wired or wireless connections, as is known in the art.

The wireless radio module 220 includes, but is not limited to, a receiver, transmitter, and/or transceiver, among others. The wireless radio module 220 is configured to receive and transmit radio frequency (RF) signals, and convert the received RF signals to digital signals. The baseband module 230 processes the digital signals before transmitting/receiving the processed signals from/to the network infrastructure 100 through the wireless radio module 220.

The coordination between the wireless radio module 220 and the baseband module 230 is maintained by the control module 270. Such control module 270 includes a processor, which is a hardware device for executing software, particularly that stored in memory 219. The processor of the control module 270 can be similar to the processing device 200 of the server 185, and therefore, the processor can be any custom made or commercially available processor, a central processing unit (CPU), an auxiliary processor among several processors associated with the base station 145, 150, 155, a semiconductor based microprocessor (in the form of a microchip or chip set), a macroprocessor, or generally any device for executing software instructions.

The network device 240 enables the base station 145, 150, 155 to communicate with the server 185 of the network infrastructure 100. The network device 240 comprises the various components used to transmit and/or receive data over the network 108, where provided. By way of example, the network device 240 include a device that can communicate both inputs and outputs, for instance, a modulator/demodulator (e.g., modem), a radio frequency (RF) device or infrared (IR) transceiver, among others.

The memory 219 of the base station 145, 150, 155 can be similar to the memory 202 of the server 185, and therefore, include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 219 may incorporate electronic, magnetic, optical, and/or other types of storage media. Note that the memory 219 can have a distributed architecture, where various components are situated remote from one another, but can be accessed by the control module 270.

The software in memory 219 may include one or more separate programs, each of which comprises an ordered listing of executable instructions for implementing logical functions. In the example of FIG. 2, the software in the memory 219 includes a suitable operating system (O/S) 222, stored boot code 252, and downloaded boot code 254. In general, the stored boot code 252 facilitates downloading the downloaded boot code 254 from the server 185 and the downloaded boot code 254 facilitates completing the initialization of the base station 145, 150, 155 during the startup or rebooting of the base station 145, 150, 155. The stored boot code 252 and downloaded boot code 254 can be stored in at least one of the following of memory 219: flash memory and hard drive. The flash memory includes, but is not limited to, memory card and universal serial bus (USB) flash drive. Operations of the stored boot code 252 and downloaded boot code 254 can be described in detail in relation to FIG. 3.

When the base station 145, 150, 155 is in operation, the control module 270 is configured to execute software stored within the memory 219, to communicate data to and from the memory 219, and to generally control operations of the base station 145, 150, 155 pursuant to the software. The stored boot code 252, downloaded boot code 254 and the O/S 22, in whole or in part, but typically the latter, are read by the control module 270, perhaps buffered within the control module 270, and then executed.

When the stored boot code 252 and downloaded boot code 254 are implemented in software, as is shown in FIG. 2, it should be noted that the stored boot code 252 and downloaded boot code 254 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

The stored boot code 252 and downloaded boot code 254 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the stored boot code 252 and downloaded boot code 254 are implemented in hardware, the stored boot code 252 and downloaded boot code 254 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A nonexhaustive list of examples of suitable commercially available operating systems 222 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 222 essentially controls the execution of other computer programs, such as the refresh manager 110, and provides scheduling, input-output control, file and data management, memory management, and communication control and related services.

If the base station 145, 150, 155 is a PC, workstation, or the like, the stored and downloaded boot codes 252, 254 are sets of essential software instructions that initialize and test hardware at startup and/or reboot, start the O/S 222, and support the transfer of data among the hardware devices. The stored boot code is generally stored in flash memory and the downloaded boot code 254 can be stored in ROM and/or the flash memory so that the stored and downloaded boot codes 252, 254 can be executed when the base station 145, 150, 155 is activated.

Figure 3:
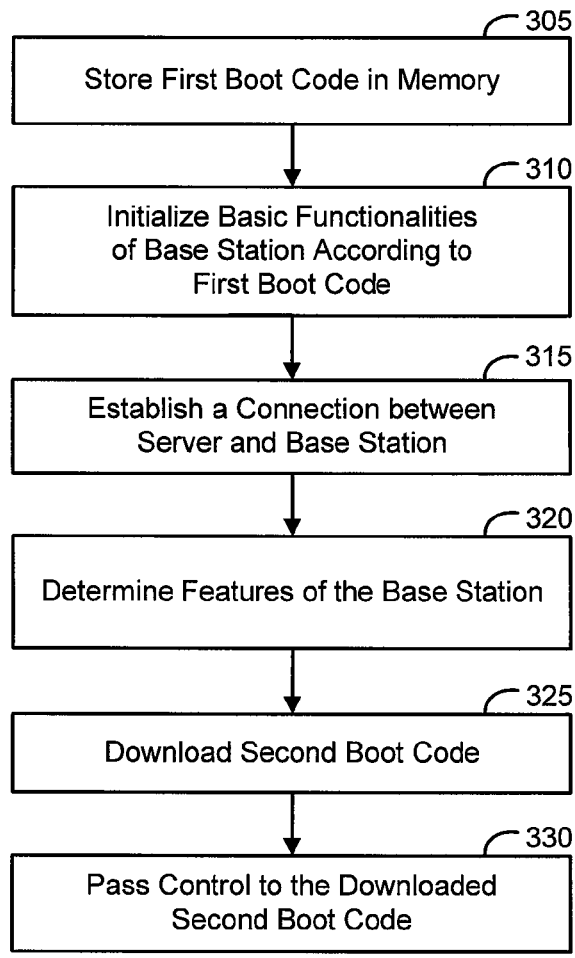
FIG. 3 is a flow diagram that illustrates an embodiment of the architectures, functionalities, and/or operations of the base stations and the server, such as that shown in FIG. 2.

FIG. 3 is a flow diagram that illustrates an embodiment of the architectures, functionalities, and/or operations of the base stations 145, 150, 155 and the server 185, such as that shown in FIG. 2. As indicated in FIG. 3, a first boot code 252 (FIG. 2) of the base station 145, 150, 155 is stored in memory 219 of the base stations 145, 150, 155, as shown in step 305. The first boot code 252 has a first set of instructions that is configured to initialize basic functionalities of the base station, as shown in step 310. The basic functionalities include, but are not limited to, initializing a control module 270 (FIG. 2) and a network device 240 (FIG. 2) to establish connection between the server 185 and the base stations 145, 150, 155, as shown in step 315.

The basic functionalities further include instructing the control module 270 and the network device 240 to establish the connection between the server 185 and the base stations 145, 150, 155. The connection can be established by sending identification data associated with the base stations 145, 150, 155 to the server 185. The identification data generally includes information that identifies the base station 145, 150, 155. For example, the identification data includes, but is not limited to, information associated with at least one of the following: a vendor, manufacturer, media access control (MAC) address, and identification of a network protocol.

Alternatively or additionally, the identification data can be used by the server 185 to authenticate the base stations 145, 150, 155. Responsive to confirming the authentication of the base stations 145, 150, 155, the server 185 is configured to establish a secure connection with the base stations 145, 150, 155. In step 320, a boot code manager 214 (FIG. 2) of the server 185 is configured to determine the features of the base station 145, 150, 155 based on the identification data and select a second boot code from a database 215 (FIG. 2) of the server 185 for the base stations 145, 150, 155 based on the determined features of the base station 145, 150, 155. The boot code manager 214 is further configured to send the selected second boot code to the base station 145, 150, 155 based on the identification data.

In step 325, the first boot code 252 instructs the control module 270 and the network device 240 to download the second boot code 254 from the server 185 into the memory 219 of the base stations 145, 150, 155. In step 330, the first boot code 252 passes control to the second boot code 254. The second boot code 254 has a second set of instructions that is different than the first set of instructions and completes the initialization of the base stations 145, 150, 155. For example, the second set of instructions includes, but is not limited to, initializing at least one of the following: wireless radio module 220 (FIG. 2), baseband processing module 230 (FIG. 2), operating system 222 (FIG. 2), and other advanced features of the control module 270 and the network device 240.

Alternatively or additionally, the second set of instructions includes, but is not limited to, enabling the alteration and/or upgrade of the features of the base stations 145, 150, 155. Alternatively or additionally, the above steps enable an administrator of the network infrastructure 100 to alter and/or update the boot code of the base stations 145, 150, 155 through a single server 185 or similar device. Alternatively or additionally, the base stations 145, 150, 155 can update their boot codes by rebooting during, for example, service time and/or down time.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. A wireless access point that is to download boot code over a network comprising:
    a wireless radio module to wirelessly receive signals from and transmit signals to a mobile station, and to convert the received signals to digital signals, wherein the wireless access point is to facilitate wireless communication of signals between the mobile station a gateway;
    a baseband module to process the digital signals before transmitting and receiving the processed signals through the wireless radio module;
    a memory; and
    a first boot code that is stored in the memory, the first boot code having a first set of instructions, wherein the first set of instructions is to:
        initialize a control module and a network device,
        instruct the control module and the network device to establish a connection between a server and the wireless access point and download a second boot code from the server into the memory of the wireless access point, the second boot code having a second set of instructions to initialize the wireless radio module and the baseband processing module, wherein the second boot code facilitates completion of an initialization of the wireless access point; and
        pass control to the second boot code.

2. The wireless access point as defined in claim 1, further comprising flash memory that stores the first boot code, the flash memory including at least one of memory card and universal serial bus (USB) flash drive.

3. The wireless access point as defined in claim 2, wherein the second boot code is stored in the flash memory.

4. The wireless access point as defined in claim 1, further comprising a hard drive that stores the second boot code.

5. The wireless access point as defined in claim 1, wherein the first set of instructions is further to send identification data associated with the wireless access point to the server, the identification data including information that identifies the wireless access point, the identification data including information associated with at least one of the following: a vendor, manufacturer, media access control (MAC) address, and identification of a network protocol, the server being configured to determine the features of the wireless access point based on the identification data and select the second boot code for the wireless access point based on the determined features of the wireless access point.

6. The wireless access point as defined in claim 5, wherein the server is to use the identification data to authenticate the wireless access point, responsive to authenticating the wireless access point, the wireless access point and the server are to establish a secure connection between each other.

7. The wireless access point as defined in claim 1, wherein the second boot code is to initialize at least one of the following: an operating system, and other advanced features of the control module and the network device.

8. A system that is to download boot code over a network comprising:
    a server; and
    a wireless access point that is electrically coupled to the server, the wireless access point including:
        a wireless radio module to wireless receive signals from and transmit to a mobile station, and to convert the received RF signals to digital signals, wherein the wireless access point is to facilitate wireless communication of signals between the mobile station a gateway;
        a baseband module to process the digital signals before transmitting and receiving the processed signals through the wireless radio module;
        a memory, and
        a first boot code that is stored in the memory, the first boot code having a first set of instructions, wherein the first set of instructions is to:
            initialize a control module and a network device, and instruct the initialized control module and network device to establish a connection between the server and the wireless access point and download a second boot code from the server into the memory of the wireless access point, the second boot code having a second set of instructions to initialize the wireless radio module and the baseband processing module, wherein the second boot code facilitates completion of an initialization of the wireless access point; and
            pass control to the second boot code.

9. The system as defined in claim 8, wherein the server receives identification data from the wireless access point, the identification data including information that identifies the wireless access point, the identification data including information associated with at least one of the following: a vendor, manufacturer, media access control (MAC) address, and identification of a network protocol, wherein the server is to determine the features of the wireless access point based on the identification data and select the second boot code for the wireless access point based on the determined features of the wireless access point.

10. The system as defined in claim 9, wherein the server uses the identification data to authenticate the wireless access point, responsive to authenticating the wireless access point, the server is to establish a secure connection with the wireless access point.

11. The system as defined in claim 10, wherein the server is to authenticate the wireless access point using the identification data, responsive to confirming the authentication of the wireless access point, the server is to send the selected second boot code based on the identification data to enable at least one of an alteration and an upgrade of the features of the wireless access point.

12. A method for downloading boot code over a network, the method comprising:
    storing a first boot code in a memory of a wireless access point having a control module, a network device, a wireless radio module, and a baseband processing module, the first boot code having a first set of instructions;

initializing the control module and the network device based on the first set of instructions;

establishing a connection between a server and the wireless access point over the network using the initialized control module and network device based on the first set of instructions;

downloading a second boot code from the server into the memory of the wireless access point using the initialized control module and network device based on the first set of instructions, the second boot code having a second set of instructions, the second set of instructions being different than the first set of instructions, wherein the second boot code facilitates completion of an initialization of the wireless access point;

passing control from the first boot code to the second boot code;

initializing the wireless radio module and the baseband processing module based on the second set of instructions, wherein the wireless radio module is to wirelessly receive signals from and transmit signals to a mobile station, and to convert the received signals to digital signals, and wherein the baseband module is to process the digital signals before transmitting and receiving the processed signals through the wireless radio module, wherein the wireless access point is to facilitate wireless communication of signals between the mobile station a gateway.

13. The method as defined in claim 12, wherein storing the first boot code is achieved by storing the first boot code in flash memory.

14. The method as defined in claim 13, wherein the second boot code is downloaded into at least one of the following: the flash memory and a hard drive of the wireless access point.

15. The method as defined in claim 12, further comprising initializing an operating system of the wireless access point based on the second set of instructions of the second boot code.

16. The method as defined in claim 12, further comprising:
sending identification data associated with the wireless access point to the server, the identification data including information that identifies the wireless access point, the identification data including information associated with at least one of the following: a vendor, manufacturer, media access control (MAC) address, and identification of a network protocol;
determining the features of the wireless access point by the server based on the identification data; and
selecting the second boot code for the wireless access point based on the determined features of the wireless access point.

17. The method as defined in claim 16, further comprising authenticating the wireless access point by the server using the identification data, the identification data including information that facilitates authentication of the wireless access point.

18. The method as defined in claim 17, further comprising responsive to confirming the authentication of the wireless access point, sending the second boot code to the wireless access point by the server based on the identification data to enable at least one of the alteration and upgrade of the features of the wireless access point.

* * * * *

UNITED STATES PATENT AND TRADEMARK OFFICE
CERTIFICATE OF CORRECTION

PATENT NO. : 8,788,637 B2
APPLICATION NO. : 12/202350
DATED : July 22, 2014
INVENTOR(S) : Koh Yew Thoon et al.

Page 1 of 1

It is certified that error appears in the above-identified patent and that said Letters Patent is hereby corrected as shown below:

In the Claims

In column 7, line 27, in Claim 1, delete "a" and insert -- and a --, therefor.

In column 8, line 18, in Claim 8, delete "a" and insert -- and a --, therefor.

In column 9, line 27, in Claim 12, delete "a" and insert -- and a --, therefor.

Signed and Sealed this
Ninth Day of December, 2014

Michelle K. Lee
*Deputy Director of the United States Patent and Trademark Office*